United States Patent

Konno et al.

[11] Patent Number: 5,166,571
[45] Date of Patent: Nov. 24, 1992

[54] VIBRATION GYRO HAVING AN H-SHAPED VIBRATOR

[75] Inventors: Masashi Konno, Yamagata; Hiroaki Yamada; Takeshi Yano, both of Tokyo; Seiichi Fujimura; Toru Kumasaka, both of Osaka, all of Japan

[73] Assignees: NEC Home Electronics, Ltd., Osaka; NEC Corporation, Tokyo, both of Japan

[21] Appl. No.: 555,376

[22] Filed: Jul. 19, 1990

Related U.S. Application Data

[63] Continuation of Ser. No. 410,030, Sep. 20, 1989, abandoned, which is a continuation of Ser. No. 236,243, Aug. 25, 1988, abandoned.

[30] Foreign Application Priority Data

Aug. 28, 1987 [JP] Japan ............... 62-214793
Sep. 28, 1987 [JP] Japan ............... 62-243490
Jan. 30, 1988 [JP] Japan ............... 63-11643
Mar. 31, 1988 [JP] Japan ............... 63-79158
Jul. 29, 1988 [JP] Japan ............... 63-190034

[51] Int. Cl.$^5$ .................................. H01L 41/08
[52] U.S. Cl. .................... 310/333; 310/321; 310/329; 73/505
[58] Field of Search ............. 310/321–323, 310/329, 333, 366, 367; 73/505, 517 AV, DIG. 4, DIG. 1

[56] References Cited

U.S. PATENT DOCUMENTS

| | | | |
|---|---|---|---|
| 3,141,100 | 7/1964 | Hart | 310/323 |
| 3,258,617 | 6/1966 | Hart | 310/321 |
| 3,842,294 | 10/1974 | Doi et al. | 310/333 X |
| 3,859,546 | 1/1975 | Doi et al. | 310/333 X |
| 4,446,394 | 5/1984 | Albert | 310/323 X |
| 4,489,609 | 12/1984 | Burdess et al. | 310/329 X |
| 4,653,325 | 3/1987 | Hojo et al. | 310/329 X |
| 4,654,663 | 3/1987 | Alsenz et al. | 310/367 X |
| 4,655,081 | 4/1987 | Burdess | 310/329 X |
| 4,689,992 | 9/1987 | Strachan | 310/333 X |
| 4,804,875 | 2/1989 | Albert | 310/321 X |
| 4,905,107 | 2/1990 | Klein | 310/333 X |
| 5,049,776 | 9/1991 | Ogawa | 310/333 |

FOREIGN PATENT DOCUMENTS 250474 1/1970 U.S.S.R. ............... 310/328

Primary Examiner—Mark O. Budd
Attorney, Agent, or Firm—Cushman, Darby & Cushman

[57] ABSTRACT

A vibration gyro having a substantially H-shaped vibrator, driving piezo-electric elements, detecting piezo-electric elements which detects Corioli's force generated when an angular velocity is applied to said vibration gyro during the vibration by the driving elements, and a supporting member supporting the vibrator, characterized in that the detecting elements are formed of a torsional piezo-electric material.

37 Claims, 9 Drawing Sheets

VIBRATION GYRO HAVING AN H-SHAPED VIBRATOR

This is a continuation of application Ser. No. 07/410,030, filed on Sep. 20, 1989, now abandoned, which is a continuation of application Ser. No. 07/236,243, filed Aug. 25, 1988, now abandoned.

BACKGROUND OF THE INVENTION

The present invention relates to a vibration gyro having an H-shaped vibrator. More particularly, the invention relates to a vibration gyro having an H-shaped vibrator with high sensitivity and with minimal detection error.

A vibration gyro operates upon the principle that Corioli's force is generated when an angular velocity is applied to a body moving at a speed. That is, a velocity is given to the body by vibrating it, and Corioli's force, which is generated when an angular velocity is applied to the body thus vibrated, is detected as a displacement of the body, so that the angular velocity is detected.

In order to obtain a stable and accurate detecting voltage, it is necessary to suppress an error voltage generated by a detecting piezo-electric element due to a leakage of a driving voltage by a mechanical influence caused by a driving vibration of a vibrator and an electrical influence caused by a voltage which is applied to a driving piezo-electric element. On the other hand, the vibration gyro has recently been required to be small in size and lightened.

There has been known a conventional vibration gyro of a fork type as shown in FIG. 1. In the conventional vibration gyro, a fork-shaped vibrator 1 is provided with two vibrating members 4 each composed of a driving vibration plate 2 and a detecting vibration plate 3 disposed perpendicularly to the driving vibration plate 2. The vibrator 1 is supported at a lower end thereof by a supporting bar 5 extending vertically. A driving piezo-electric element 6 is mounted on each of the driving vibration plate 2 and a detecting piezo-electric element 7 is mounted on each of the detecting vibration plate 3, wherein polarities of which are arranged as shown in FIG. 1.

In the conventional vibration gyro, the driving vibration plate 2, that is a driving vibrating part of the vibrator 1 is separately and perpendicularly disposed to the detecting vibration plate 3, that is a detecting vibration part. Under such a structure, the driving vibration may not influence to the detecting piezo-electric element 7 and, therefore, a leakage of the driving voltage will be suppressed. However, since the supporting bar 5 does not support at a gravitational center of the vibrator 1, a noise vibration may be generated by the vibrator 1 thereby deteriorating a detecting accuracy of Corioli's force.

Further, the vibrator 1 may not easily be processed because the driving vibration plate 2 is unitary in form with and perpendicularly to the detecting vibration plate 3.

In the vibration gyro shown in FIG. 2, driving piezo-electric elements 12A and 12B are mounted on upper and lower portions, respectively, of both sides in a widthwise direction of a vibrator 11 and four detecting piezo-electric elements 13 are mounted on a side perpendicular to that in the widthwise direction. The upper driving piezo-electric elements 12A are opposite in polarity to the lower elements 12B. This vibration gyro also has a supporting bar 14 supporting the vibrator 11 and being secured to a casing 15. When a voltage is applied to the driving piezo-electric elements 12A and 12B, the vibrator 11 vibrates in a Y direction symmetrically in left and right directions and asymmetrically in upper and lower viewing from the front of the vibrator. Under this condition, the detecting piezo-electric elements 13 detect Corioli's force generating around an X direction which is perpendicular to the driving vibration direction.

On the other hand, in the vibration gyro shown in FIG. 3, the H-shaped vibrator 11 is supported by a plate spring 16 on which detecting piezo-electric elements 13A are mounted. In this vibration gyro, all the four driving piezo-electric elements 12A and 12B are equal in polarity with one another. In this vibration gyro, when a voltage is applied to the driving piezo-electric elements 12A and 12B, the vibrator 11 vibrates in the Y-direction symmetrically in left and right directions and in upper and lower directions viewing from the front. Under this condition, the detecting piezo-electric elements 13A detect Corioli's force generating around a Z direction by detecting a displacement of the plate spring 16.

According to the vibration gyro shown in FIG. 2, the driving piezo-electric elements 12A, 12B and the detecting piezo-electric elements 13 are commonly mounted on the vibrator 11 in proximity to one another. Therefore, there may occur a difficulty in that a large amount of leakage of the driving voltage from the driving piezo-electric elements 12A and 12B may be applied to the detecting piezo-electric element 13.

On the other hand, in the vibration gyro shown in FIG. 3 in which the displacement of the plate spring 16 is detected, a detecting accuracy may be influenced by a supporting system including the plate spring 16. In other words, the vibrator 11 may be influenced by the supporting system and the material of the casing. In order to prevent such a difficulty, the casing has to be formed of a heavy material so that the vibration gyro may not be made small in size and lightened.

SUMMARY OF THE INVENTION

Accordingly, an object of the present invention is to prevent the above-described difficulty accompanying a conventional vibration gyro and to further improve the vibration gyro having an H-shaped vibrator proposed by the present applicants.

That is, an object of the present invention is to provide a vibration gyro having high sensitivity in which a detection error due to external vibrations can be decreased.

Another object of the invention is to provide a vibration gyro which can stably generate an output voltage with small influence caused by a leakage of the driving voltage and by a supporting system.

Further, an object of the present invention is to provide a vibration gyro small in size and lightened by which Corioli's force can be detected at the largest.

Moreover, an object of the invention is to provide a vibration gyro in which a vibrator can readily be processed.

In accordance with the above and other objects, a vibration gyro of the present invention is provided with a torsional piezo-electric element mounted on a center part of an H-shaped vibrator as a detecting piezo-electric element or alternatively as a driving piezo-electric element, which element generates a voltage in proportion to an amount of a torsional displacement thereof.

If the torsional piezo-electric element is employed as a detecting piezo-electric element, a driving piezo-electric element is mounted on both sides in a widthwise direction of the vibrator. In this structure, if the center part of the vibrator is displacely vibrated by Corioli's force, the torsional piezo-electric element detects an amount of the torsion and the Corioli's force can be detected based on the amount of the torsion. According to the present invention, the driving piezo-electric element mounted on the side in width direction of the vibrator is positioned distantly from the position of the detecting torsional piezo-electric element so that the leakage of the driving voltage applied to the detecting piezo-electric element is extremely small. Further, since the detecting torsional piezo-electric element of the invention is directly mounted on the vibrator, the detecting accuracy would not be influenced by the supporting system.

Further, according to the present invention, an H-shaped vibrator may be provided with a narrow part on a center portion of a connecting part of the vibrator, wherein the narrow part is supported by a supporting bar and a torsional piezo-electric element is disposed on the narrow part. In such a structure, the vibrator may form as if two fork-shaped members are unitary formed opposite in up and down with each other and adhered at the narrow part.

As generally known, a thickness of a bottom part of the fork-shaped member exceeds a predetermined value, the bottom part hardly bends and therefore the vibration mode will not be influenced by the supporting system. On the other hand, however, a resonance frequency of the detecting vibration will disadvantageously increase.

In the present invention, the resonance frequency of the detecting vibration can easily be conformed with that of the driving vibration by adjusting the width of the narrow part on which the detecting piezo-electric element is mounted. Therefore, the preferred thickness of the bottom part of the vibrator can easily be obtained. If the vibrator having the thick bottom part and a narrow part at the center thereof, the narrow part would not vibrate in upward or downward directions during the vibration of the vibrator, and also the supporting bar supporting the vibrator at the narrow part thereof would not influence to the driving vibration mode of the vibrator. Further, since the supporting bar positions at a node of the detecting vibration mode, the supporting system would not influence to the driving and detecting vibration modes. Therefore, the leakage of the driving voltage applied to the detecting piezo-electric element is extremely small thereby obtaining a stable detection voltage.

Furthermore, according to the present invention, a vibrator may be formed by adhering two U-shaped members opposite to each other viewing from the front through a piezo-electric plate generating a voltage between the opposite surfaces in accordance with a torsional force applied therebetween. In this structure, the vibrator having four extending arm portions vibrates in a primary vibration mode in which upper and lower arms direct opposite to each other and left and right arms direct opposite to each other viewing from the front, and all of the arms vibrate in a cantilever form. Under this condition, if the vibrator rotates about a vertical axis of the vibrator, Corioli's force is generated.

The Corioli's force becomes a double forces, which rotates the upper and lower U-shaped members in opposite direction to each other. The double forces act as a torsional force to the piezo-electric plate disposed between the U-shaped members and therefore the plate can detect a voltage in proportion to the Corioli's force. As explained above, all of the four arm parts of the vibrator vibrate in the primary vibration mode forming a cantilever, the double forces by the Corioli's force become the largest and therefore the detecting voltage of the piezo-electric plate can be obtained at the largest.

Furthermore, in the present invention, an H-shaped vibrator may consist of driving vibration plates and detecting vibration plates disposed on an end of the driving vibration plates and unitary formed therewith, wherein a thickness direction of the detecting vibration plate may be perpendicular to that of the driving vibration plate and the H-shaped vibrator is supported by a supporting bar passing through a gravitational center of the vibrator. In the vibration gyro thus structured, the driving vibration plate, that is a driving vibration part is separately disposed from the detecting vibration plate, that is a detecting vibration part and both of which are provided perpendicularly with each other. Therefore, the driving vibration will not influence to the detecting piezo-electric element mounted on the detecting vibration plate thereby suppressing the influence due to a leakage of the driving voltage.

Further, since the vibrator is supported by the supporting bar at the gravitational center thereof, an unnecessary external vibration applied to the vibrator can sufficiently suppressed. Accordingly, the detecting accuracy of the vibration gyro can be improved.

Moreover, since a width of the detecting vibration plate is arranged to be the same as a thickness of the driving vibration plate, a preferred shape of the vibrator can readily be processed by cutting a single plate or the like.

DETAILED DESCRIPTION OF THE INVENTION

The present invention will now be described in detail with reference to accompanying drawings.

FIGS. 4 to 7 show a first embodiment of the present invention.

Figure 1:
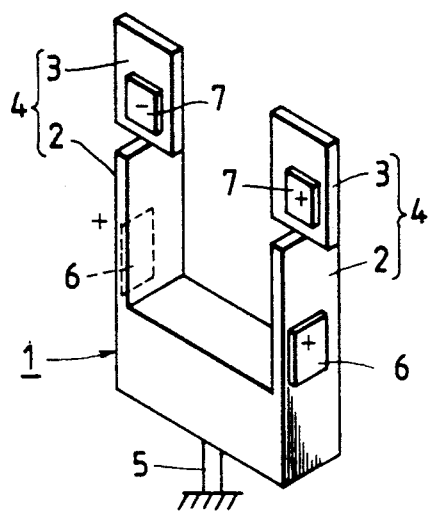
FIG. 1 is a perspective view showing a conventional vibration gyro.
Figure 2:
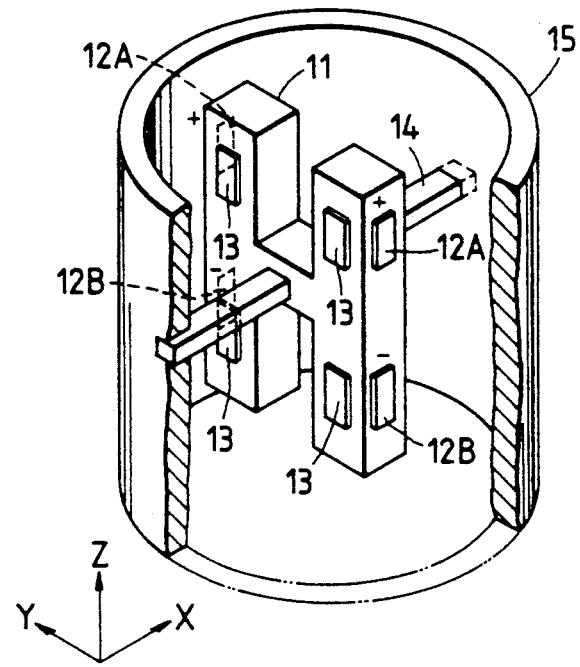
FIG. 2 is a perspective view illustrating a proposed vibration gyro having an H-shaped vibrator.
Figure 3:
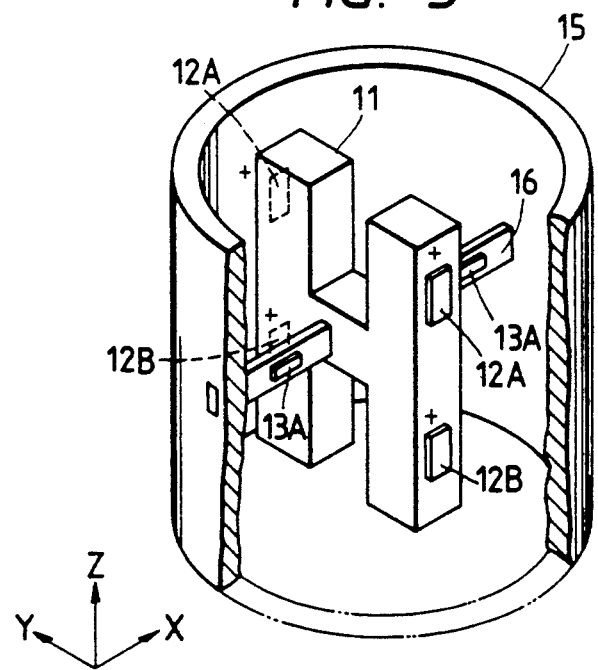
FIG. 3 is a perspective view illustrating another proposed vibration gyro having an H-shaped vibrator.
Figure 4:
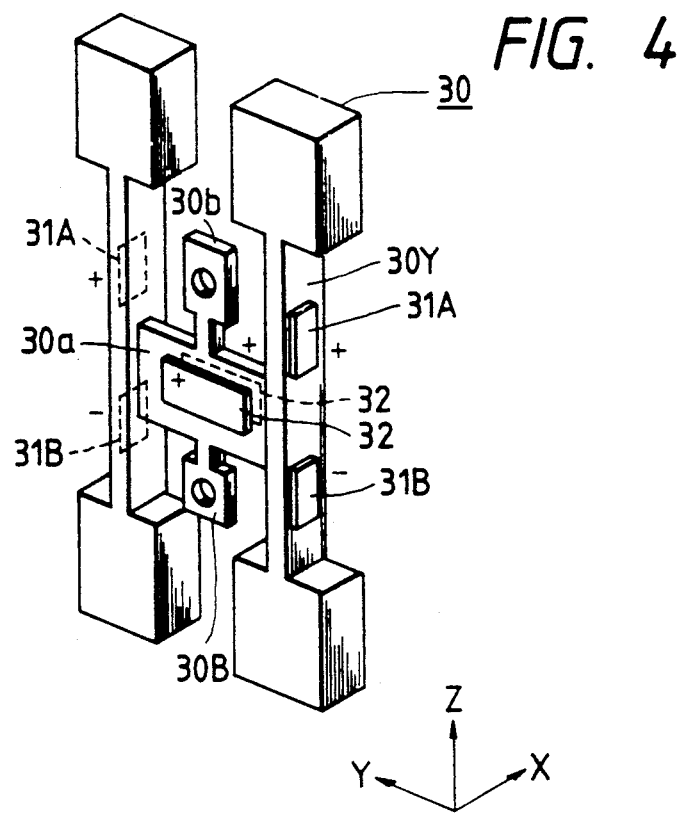
FIG. 4 is a perspective view showing a first embodiment of a vibration gyro according to the present invention.

In FIG. 4, four driving piezo-electric elements 31A and 31B are mounted on upper and lower portions of two side walls 30Y in a Y direction, that is, a widthwise direction of an H-shaped vibrator 30. Reference symbols + and − of the piezo-electric elements 31A and 31B shown in FIG. 4 denote a polarity of the elements. A polarity causing an expanding displacement of the element in a Z direction when a voltage is applied between an external electrode and the piezo-electric elements is denoted as a positive polarity + and a polarity causing a contracting displacement is denoted as a negative polarity −. The upper driving piezo-electric elements 31A are opposite in polarity to the lower elements 31B. Going from left to right of each of the elements 31A and 31B are equal in polarity. The vibrator 30 is provided with a plate-like center portion 30a which is thinner than that of the conventional vibrator in order that the center portion 30a may easily be torsioned. A torsional resonance frequency of the center portion 30a is in the proximity of the resonance frequency (of the vibration in the Y direction) of the driving piezo-electric elements 31A and 31B. Torsional detecting piezo-electric elements 32 generating a voltage in proportion to an amount of the torsion of the center portion 30a are mounted on both surfaces of the plate-like center portion 30a. The torsional detecting piezo-electric elements 32 are equal in polarity with each other. When the torsional detecting piezo-electric elements 32 as described later, the polarity of the elements 32 is selected so that an outer electrode of each of the elements 32 generates a positive electric charge and an inner electrode of each of the elements (contacting to the vibrator) generates a negative electric charge. Such is explained as the "equal situation in polarity" in this invention. The center portion 30a is provided at upper and lower portions thereof with supporting projections 30b which are unitarily formed with the center portion 30a. The supporting projections 30b are sandwiched between a supporting member of a casing (not shown) and fastened thereto by a bolt or the like.

Figure 5A:
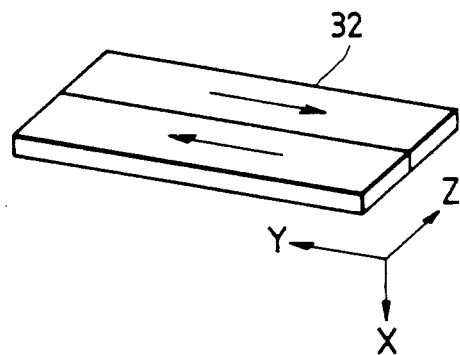
FIGS. 5A and 5B illustrate arrangements of a torsional piezo-electric element according to the invention.
Figure 5B:
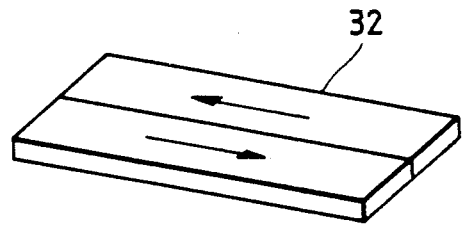
Figure 6A:
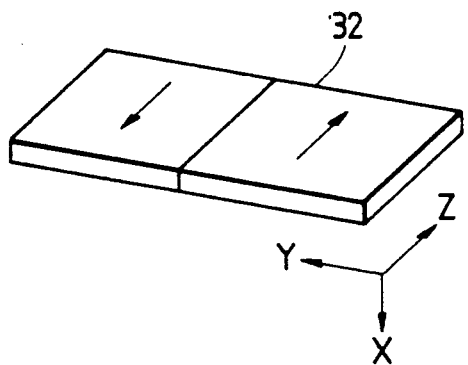
FIGS. 6A and 6B illustrate another arrangements of a torsional piezo-electric element of the present invention.
Figure 6B:
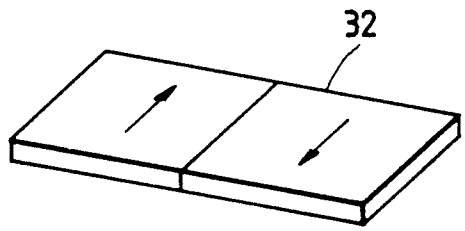

The torsional detecting piezo-electric elements 32 are formed of a piezo-electric material generating a voltage in accordance with a sliding torsion applied thereto. As shown in FIGS. 5 and 6, the torsional piezo-electric elements 32 may be composed of two materials opposite in polarization direction (shown in arrows) to each other. FIGS. 5A and 5B show arrangements in which the two materials are longitudinally split and FIGS. 6A and 6B show another arrangement in which the materials are transversely split. The arrangements are opposite in polarization direction to each other.

Employing the above-explained arrangements of the torsional piezo-electric element 32, when the element 32 is torsioned, the element 32 generates a voltage in proportion to an amount of the torsion thereof. If the direction of the torsion is reversed, the element 32 generates a voltage opposite in polarity. Further, when a voltage is applied to the element 32, the element 32 torsions.

The operation of the vibrator 30 thus structured will be described hereinbelow.

Figure 7A:
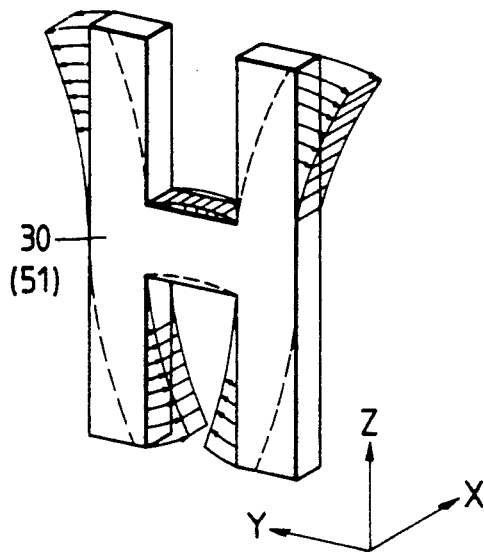
FIGS. 7A and 7B show driving and detecting vibration modes, respectively, of the vibrator shown in FIG. 4.

When an alternating voltage is applied to the driving piezo-electric elements 31A and 31B from an oscillating circuit or the like not shown, the vibrator 30 vibrates in a vibration mode in which right and left parts of the vibrator 30 bend symmetrically and upper and lower parts bend asymetrically, viewing from the front as shown in FIG. 7A since the upper driving piezo-electric elements 31A are opposite in polarity to the lower elements 31B. In this condition, if an angular velocity directing around a Z axis is applied to the vibrator 30, the vibrator 30 generates Corioli's force directing in an X axis which is perpendicular to the-vibration direction of the vibrator 30. The vibrator 30 vibrates by the Corioli's force in a vibration mode shown in FIG. 7B, that is, a vibration mode in which the center portion 30a torsions. As described above, since the torsional resonance frequency of the center portion 30a of the vibrator 30 is in the proximity of the resonance frequency of the driving vibration, the center portion 30a torsionally vibrates due to the Corioli's force. When the center portion 30a torsions, the torsional piezo-electric element 32 generates a voltage which is in proportion to an amount of the torsion of the torsional piezo-electric element 32 so that the amount of the torsion of the center portion 30a is detected. The Corioli's force can be determined in accordance with the amount of the torsion, and the angular velocity applied to the vibration gyro is detected by calculating the Corioli's force.

Since the driving piezo-electric elements 31A and 31B mounted on the transverse sides of the vibrator 30 are positioned apart from the detecting torsional piezo-electric elements 32 mounted on the center portion 30a, the leakage of the driving voltage of the driving piezo-electric elements 31A and 31B will not act on the detecting piezo-electric elements 32.

Moreover, since the detecting torsional piezo-electric elements 32 are directly mounted on the vibrator 30, the detecting accuracy would not be influenced by a supporting system supporting the vibrator 30. Therefore, Corioli's force can stably be detected with high accuracy.

In the first embodiment disclosed above, the torsional piezo-electric elements 32 mounted on the center portion 30a are employed as detecting elements. However, the elements 32 may be employed as driving elements while the piezo-electric elements 31A and 31B mounted on the transverse side of the vibrator 30 can be utilized for detecting. In this case, when an alternating voltage is applied to the torsional piezo-electric elements 32 on the center portion 30a, the torsional piezo-electric elements 32 torsionally vibrates thereby driving the vibrator 30 so that the center portion 30a torsionally vibrates with the vibration mode shown in FIG. 7B. Under this condition, when an angular velocity is applied to the vibrator 30 and Corioli's force is generated, the vibrator 30 vibrates with a vibration mode shown in FIG. 7A. The piezo-electric elements 31A and 31B then detect the detecting vibration of the vibrator 30 and therefore the Corioli's force is calculated. In this arrangement, a leakage of the driving voltage would not act on the detecting elements and the detection voltage would no be influenced by the supporting system either. Such an exchange between the driving and detecting vibration modes may also be applicable in the following embodiments.

Figure 8:
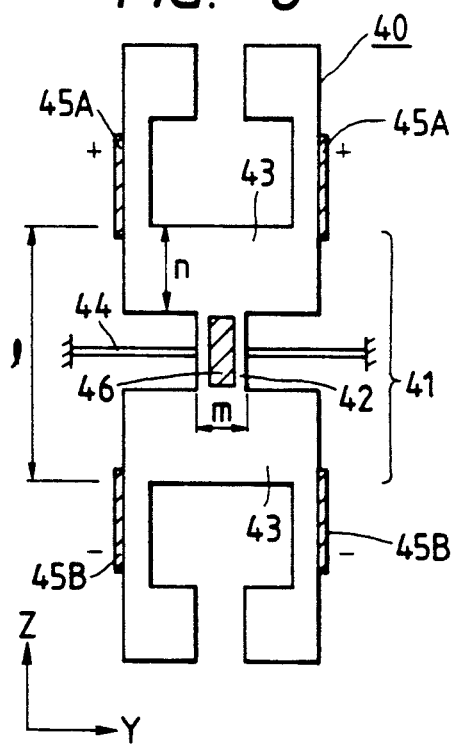
FIG. 8 is a front view of a second embodiment of a vibration gyro according to the present invention.
Figure 9:
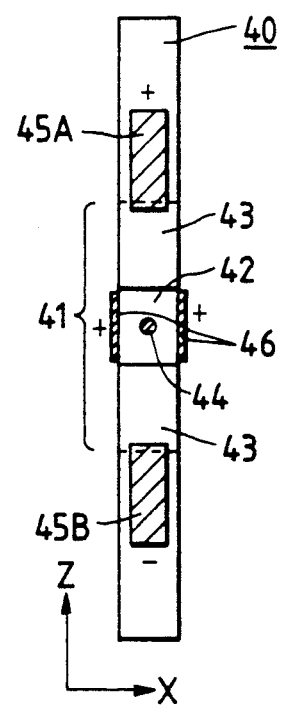
FIG. 9 is a side view of the vibration gyro shown in FIG. 8.

FIGS. 8 and 9 show a second embodiment of a vibration gyro according to the present invention.

FIG. 8 is a front view of the vibration gyro and FIG. 9 is a side view thereof. A vibrator 340 is substantially H-shaped having a connecting part 41 a length 1 in a Z axis of which is sufficiently large. A center portion in an X axis of the connecting part 41 has a reduced width m to define a narrow part 42. Each of upper and lower parts of the vibrator 40 with respect to the narrow part 42 is fork-shaped and provided with a bottom part 43 a thickness n in the Z axis of which is sufficiently large. A supporting bar 44 passes through the narrow part 42 in the widthwise direction thereof (Y axis) and fixedly secured thereto. Both ends of the supporting bar 44 are fixedly engaged to a casing not shown. Four driving piezo-electric elements 45A and 45B are mounted on upper and lower, and right and left sides of the vibrator 40. The upper piezo-electric elements 45A are opposite in polarity to the lower elements 45B, as is the same as that of the first embodiment shown in FIG. 4.

Torsional piezo-electric elements 46 are mounted on both side surfaces in the X axis of the narrow part 42 both of which are equal in polarity with each other.

Figure 7B:
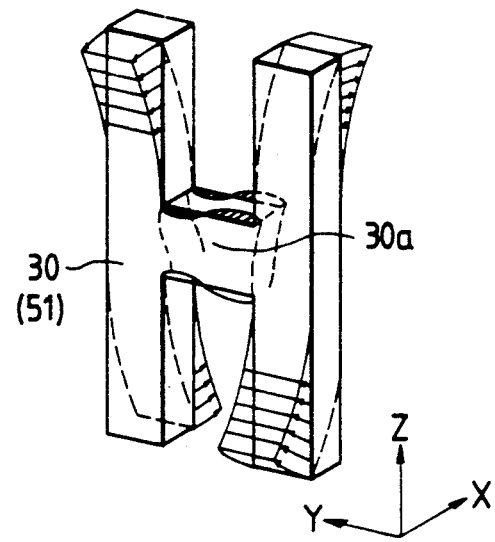

The vibrator 40 thus structured vibrates in a vibration mode shown in FIGS. 7A and 7B. However, in the second embodiment, since the thickness n of the bottom part 43 of the connecting part 41 is sufficiently large, the bottom part 43 will hardly be deformed in the upper and lower direction. Further, since the narrow part 42 has the small width m, the narrow part 42 would not bend during the vibration in the upper and lower direction thereof. Because of such a feature, the vibration mode would not be influenced by a presence of the supporting bar 44 passing through the narrow part 42 in the widthwise (Y) direction and being fixed to the casing. Furthermore, the supporting bar 44 positions at a node of the detecting vibration mode. Therefore, the supporting bar 44 supports the vibrator 40 without influencing to the driving and detecting vibration modes.

Generally, in a fork-shaped vibrator, if a thickness of a bottom part exceeds a predetermined thickness, the bottom part of the vibrator will hardly bend owing to its stiffness and, therefore, a vibration mode will not be influenced by a supporting system supporting the vibrator. On the other hand, however, a torsional resonance frequency that is a resonance frequency of the detecting vibration will increase. If the resonance frequency of the detecting vibration is largely different from that of the driving vibration, it may be difficult to maintain the vibration by the Corioli's force so that the Corioli's force would not be detected accurately.

In contrast, according to the second embodiment of the present invention, the resonance frequency of the detecting vibration can readily be maintained lower to conform with the resonance frequency of the driving vibration by adjusting the width m in the Y direction of the narrow part 42 on which the detecting piezo-electric elements are mounted. Therefore, the thickness n of the bottom part 43 can sufficiently be made large.

In the vibrator 40 of the invention having the thick bottom part 43 and the narrow part 42, the narrow part 42 will hardly vibrate in the upper and lower directions as to the driving vibration mode so that the supporting bar 44 supporting the narrow part 42 in the widthwise direction thereof (Y direction) will not influence to the driving vibration mode of the vibrator 40. Further, the supporting bar 44 positions at the node of the detecting mode. Hence, the supporting system will not influence to the driving and detecting vibration modes. Therefore, the vibrator having such a structure can sufficiently decrease the leakage of the driving voltage applied to the detecting piezo-electric element, that is, the torsional piezo-electric element 46. Moreover, the vibrator of the invention improves the quality factor Q since it can be considered that the quality factor Q varies according to the supporting system of the vibrator. Accordingly, the vibrator of the invention can stably detect Corioli's force with high accuracy.

Figure 10:
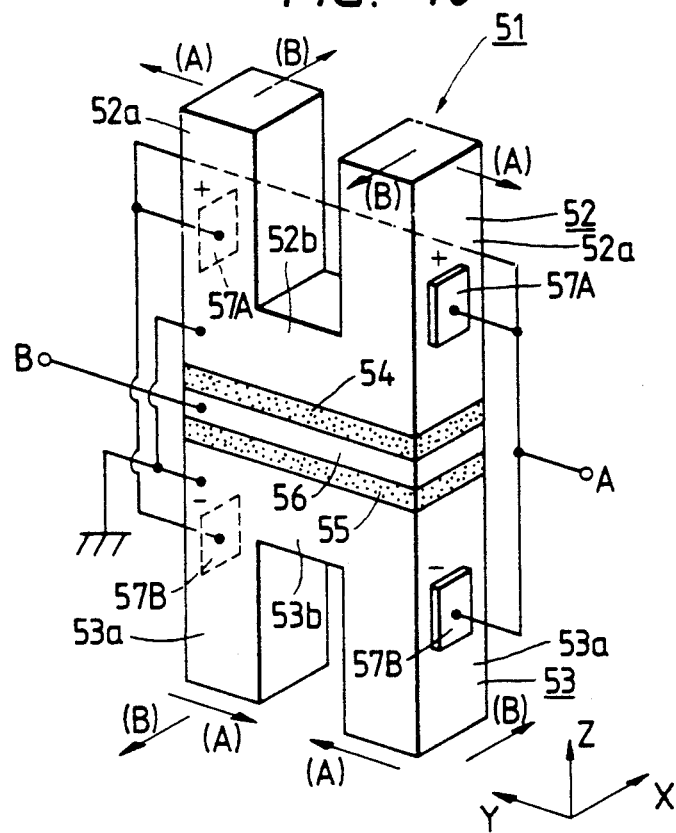
FIG. 10 is a perspective view of a vibration gyro embodying a third embodiment of the present invention.

FIG. 10 is a perspective view showing a vibration gyro according to a third embodiment of the present invention.

In this embodiment, a vibrator 51 is provided with a pair of substantially U-shaped members 54 and 55 formed of a metal material, two torsional piezo-electric plates 54 and 55 and a metal plate 56 sandwiched between the plates 54 and 55 thereby forming an H-shaped vibrator.

The piezo-electric plates 54 and 55 are disposed in an opposite direction with respect to the metal plate 56. The piezo-electric plates 54 and 55 may be formed of a piezo-electric material generating a voltage in accordance with a slipping deformation and arranged as shown in FIGS. 5 and 6. In such a structure, when a voltage is applied between the opposed surfaces of the piezo-electric plates 54 and 55, the plates 54 and 55 torsionally deform in a plane of X-Y.

The U-shaped members 52 and 53 is provided with leg parts 52a and 53a, respectively. Four driving piezo-electric elements 57A and 57B are mounted on outer sides in Y direction of each of the leg parts 52a and 53a. The upper piezo-electric elements 57A and the lower piezo-electric elements 57B are opposite in polarity to each other. Electric wires are connected to the vibrator 51 as shown in FIG. 10. That is, a common alternating voltage is applied to the driving piezo-electric elements 57A and 57B by an oscillating circuit or the like not shown through a terminal A whereas the upper and lower U-shaped members 52 and 53 are earthed. Each of the piezo-electric plates 54 and 55 output a voltage through the metal plate 56 sandwiched therebetween. The vibrator 51 is rotatably supported by a supporting shaft not shown passing vertically through a center portion of base parts 52b and 53b of the U-shape members 52 and 53.

The operation of the vibration gyro thus structured will be described.

When an alternating voltage is applied to the driving piezo-electric elements 57A and 57B, the leg parts 52a, 52b, 53a and 53b of the vibrator 51 vibrate in a vibration mode in which the upper and lower leg parts direct opposite to each other and right and left parts direct opposite to each other as indicated in arrows A. In the vibration mode of the vibrator 51 thus structured, each of the four leg parts 52a, , and 53a vibrates in a form of a cantilever, that is, a primary vibration mode. Under this condition, if an angular velocity directing around a Z direction is applied to the vibrator 51, Corioli's force is generated in arrows B direction which are perpendicular to the direction of the driving vibration. The Corioli's forces become double forces which rotate the upper U-shaped member 52 and the lower U-shaped member 53 in directions opposite to each other. Since the double forces act on the piezo-electric plates 54 and 55, as a torsional force, sandwiched between the U-shaped members 52 and 53, a voltage in proportion to the Corioli's force is generated between the opposed surfaces of each of the piezo-electric plates 54 and 55. The voltage is outputted from a terminal B through the metal plate 56 contacting both to the piezo-electric plates 54 and 55. The Corioli's force is determined by the output voltage, and the angular velocity applied to the vibration gyro is determined by calculating the Corioli's force.

In the above operation, the leg parts 52a and 53a form a cantilever and vibrate in the primary vibration mode. Therefore, since the leg parts 52a and 53b vibrate in the primary vibration mode, the double forces of the Corioli's force become the largest and therefore the torsional force applied to the piezo-electric plates 54 and 55 becomes the largest. Accordingly, the piezo-electric plates 54 and 55 output the largest voltage. Hence, the Corioli's force can be obtained at the largest.

The vibration gyro of the third embodiment of the invention described above employs two piezo-electric plates because it may cause a problem for detecting an output from the piezo-electric plates if both the sides of the piezo-electric plate contact to the U-shaped member while the U-shaped members 52 and 53 itself are utilized for earthing the driving and detecting piezo-electric elements as described in the above embodiment. However, it may be applicable that the gyro is provided with a single piezo-electric plate (upper piezo-electric plate 54, for example) and merely an insulating plate in place of the lower piezo-electric plate 55.

FIGS. 12 to 15 show a vibration gyro of the fourth embodiment according to the present invention.

In the fourth embodiment, substantially U-shaped members 62 and 63 consist of disc-shaped base parts 62b and 63b and a pair of leg parts 62a and 63a unitary formed with the base parts 62b and 63b respectively. The base parts 62b and 63b are held in contact with each other through a single piezo-electric plate 64. Driving piezo-electric elements 65A and 65B are mounted on the leg parts 62a, 63a polarities of which are opposite to each other. In this vibration gyro, at least one side of the piezo-electric plate 64 has to be insulated from the U-shaped member in order to detect a voltage being independent from the driving voltage. However, if the U-shaped member is not formed of a metal material but of a material having no conductivity, the piezo-electric plate may not have to be insulated. In this case, another earth means should be provided.

Although no supporting system supporting the vibrator 61 is shown in the drawings, outer periphery of the base parts 62b, 63b may be supported while the vibrator is not prevented from rotating, or a supporting bar may be provided which bar vertically passes through a center portion of the base parts 62b and 63b.

The operation of the above-described fourth embodiment will be described.

Figure 12:
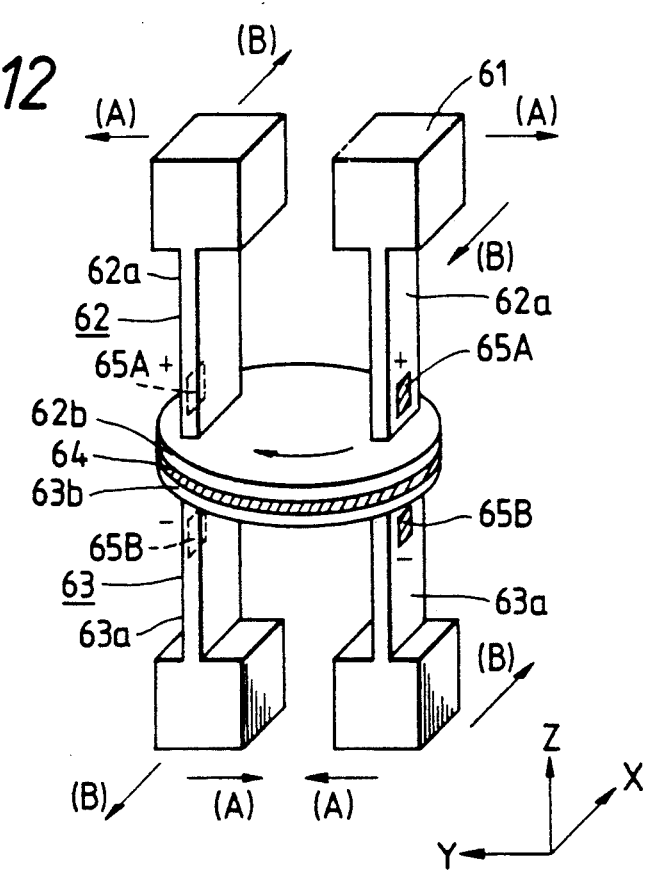
FIG. 12 is a perspective view illustrating a vibration gyro according to a fourth embodiment of the present invention.

When the four driving piezo-electric elements 65A and 65B are actuated, the leg parts 62a, 63a of the vibrator 61 vibrate in a primary vibration mode in which upper and lower legs bend opposite to each other and right and left legs bend opposite to each other as indicated in arrows A direction shown in FIG. 12. Under this condition, if an angular velocity directing around a Z axis is applied to the vibrator 61, Corioli's force is generated which force directs in a direction of arrows B perpendicular to the direction of the driving vibration. The Corioli's force becomes double forces which rotate the upper and lower U-shaped members 62 in opposite direction to each other. The double forces act as a torsional force on the piezo-electric plate 64 disposed between the base parts 62b and 63b so that the piezo-electric plate 64 generates a voltage which is in proportion to the Corioli's force.

In the fourth embodiment, four leg parts 62a and 63a form a cantilever during the vibration, that is, the vibrator 61 vibrates in a primary vibration mode. Therefore, the largest Corioli's force can be detected.

Figure 16:
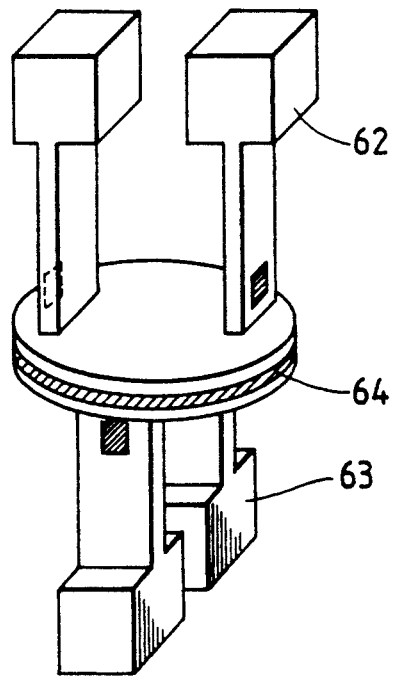
FIG. 16 is a perspective view showing a fifth embodiment of a vibration gyro according to the present invention.
Figure 13:
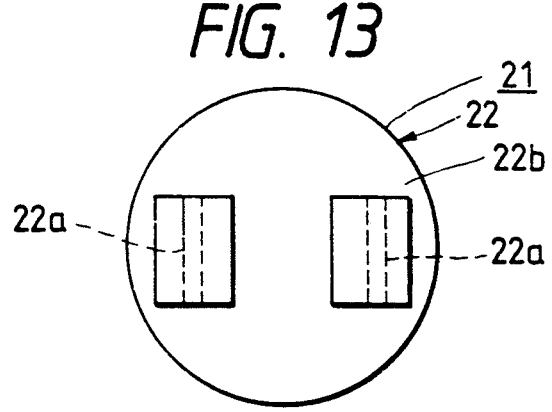
FIG. 13 is a top view showing the vibration gyro of FIG. 12.
Figure 14:
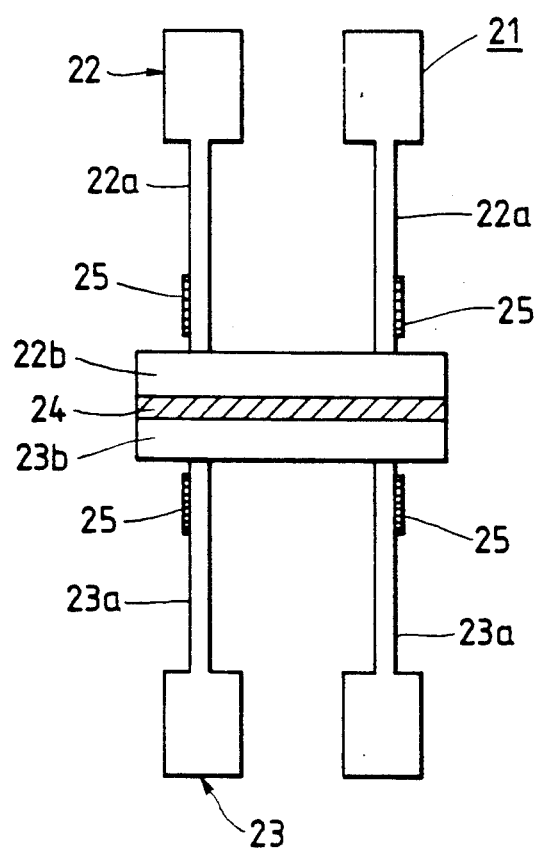
FIG. 14 is a front view showing the vibration gyro of FIG. 12.
Figure 15:
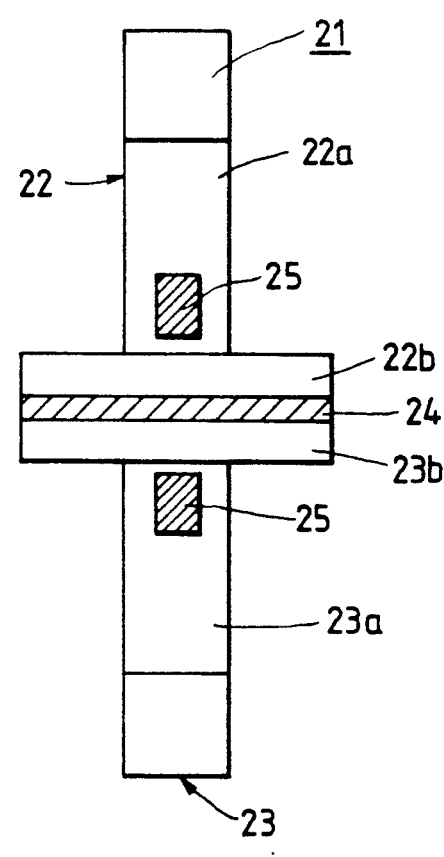
FIG. 15 is a side view showing the vibration gyro of FIG. 12.

FIG. 16 is a perspective view showing a fifth embodiment of the vibration gyro according to the present invention. As shown in FIG. 16, the vibration gyro is provided with an upper U-shaped member 62 and lower U-shaped member 63 disposed perpendicularly to the upper members 62 viewing from the top. Other parts and components are the same as that of the fourth embodiment shown in FIG. 12. Such a structure is advantageous in that a force applied to the vibrator is uniformly distributed with respect to a circumference direction and therefore the vibrator will smoothly be operated.

In the fourth and fifth embodiments described above, the piezo-electric elements 57A, 57B and 65 are mounted on the leg parts of the U-shaped member driving the vibrator and the piezo-electric plates 54, 55 and 64 are utilized as detecting elements. However, it may be applicable that the piezo-electric plates 54, 55 and 64 are employed for driving the vibrator and the piezo-electric members 57 and 65 are for the detection.

Figure 11:
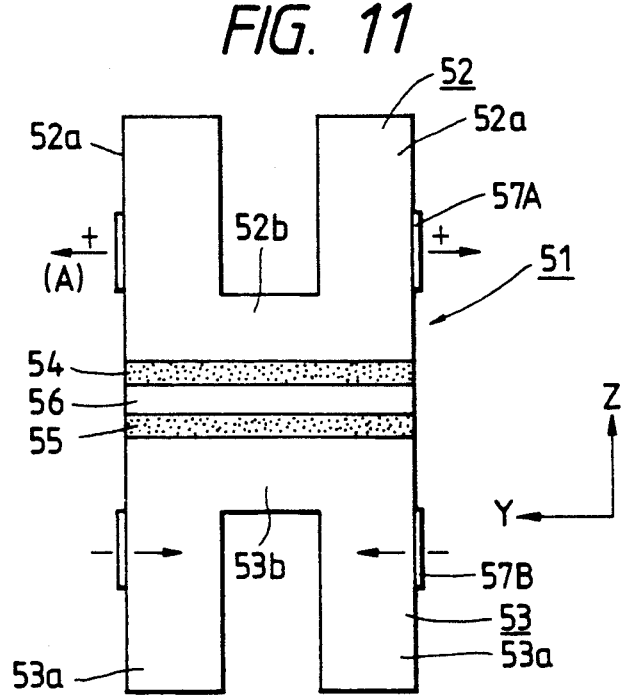
FIG. 11 is a front view showing the vibration gyro of FIG. 10.
Figure 17:
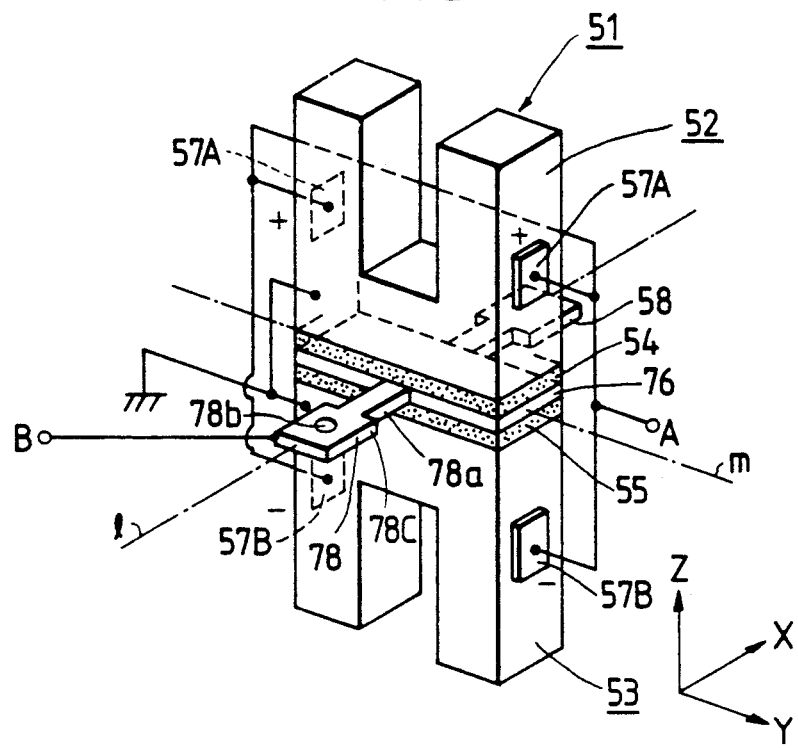
FIG. 17 is a perspective view showing a sixth embodiment of a vibration gyro according to the present invention.

FIGS. 17 to 20 show a sixth embodiment of the vibration gyro according to the present invention. Specifically, FIG. 17 is a perspective view showing a vibration gyro according to the sixth embodiment of the present invention. This gyro is substantially the same in shape and function as that of the third embodiment shown in FIGS. 10 and 11. However, the vibration gyro of the sixth embodiment is provided with projecting parts 78 unitary formed with a detecting piezo-electric plate 76.

Figure 18:
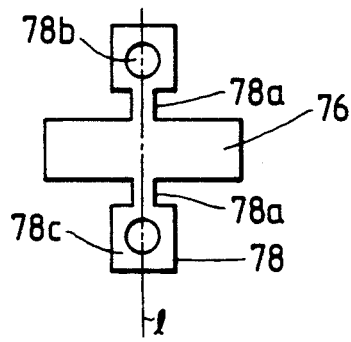
FIG. 18 is a top view showing a projecting part shown in FIG. 17.

In the sixth embodiment, the projecting parts 78 are unitary formed with the detecting piezo-electric plate 76 by cutting a single metal plate out or the like. The projecting part 78 has a narrow neck part 78a and a mounting part 78c with a mounting hole 78b as shown in FIG. 18. The projecting parts 78 extend from both the sides of the plate 76 in a direction of a center line 1 passing through a center point of the H-shaped vibrator 51.

In the vibration mode of the driving vibration shown in FIG. 7A and in the detecting vibration shown in FIG. 7B, a point of the vibrator through which a front center line 1 (one-dot line) passes and a point through which a side center line m (one-dot line) passes do not move during the vibrations. In the sixth embodiment, since the vibrator 51 is supported by the projecting part 78 through which the front center line 1 passes, that is, the vibrator 51 is supported on a point which does not move during the vibrations, both the driving and detecting vibrations are stably operated. Accordingly, a stability of the detection can be improved.

Further, since the projecting part 78 for supporting the vibrator is unitary formed with the detecting plate 76, the detecting voltage can be taken from the projecting part 78 thereby canceling an intricate lead wire.

Figure 19:
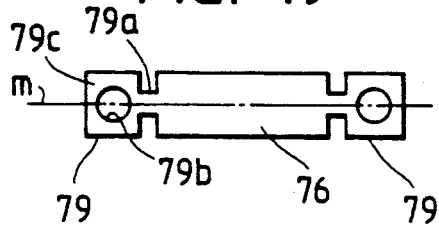
FIG. 19 is a top view showing an arrangement of a projecting part shown in FIG. 17.
Figure 20:
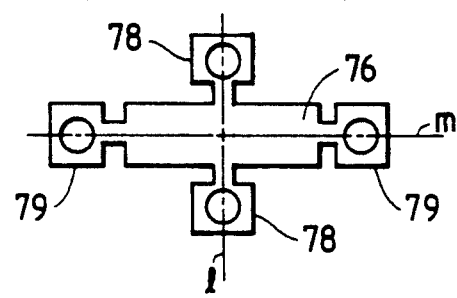
FIG. 20 is a top view showing another arrangement of a projecting part shown in FIG. 17.

The projecting part may not be limited to that shown in FIG. 18. That is, the projecting part may be formed as shown in FIG. 19 or FIG. 20. FIG. 19 shows projecting parts 79 extending on the side center line m. Each of the projecting part 79 is provided with a narrow neck part 79a and a mounting part 79c with a mounting hole 79b. On the other hand, FIG. 20 shows another arrangement having both the projecting parts 78 shown in FIG. 18 and the projecting parts 79 shown in FIG. 19. In this arrangement, since the vibrator 51 is supported by the four projecting parts 78 and 79, the vibrator 51 can be firmly and stably supported.

FIGS. 21 to 24 show a seventh embodiment of the vibration gyro according to the present invention.

Figure 21:
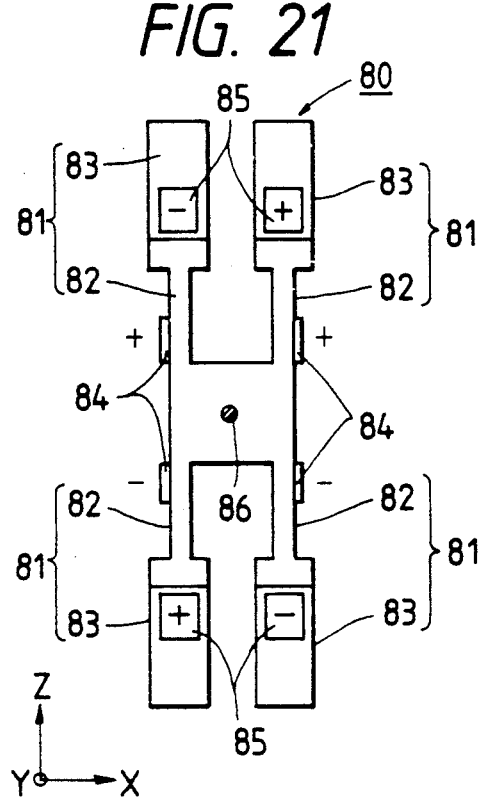
FIG. 21 is a front view illustrating a seventh embodiment of a vibration gyro according to the present invention.
Figure 22:
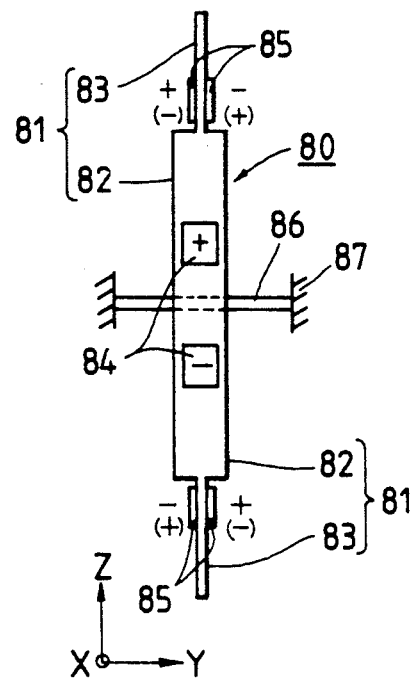
FIG. 22 is a side view of the vibration gyro shown in FIG. 21.

As shown in FIGS. 21 and 22, a vibrator 80 is provided with four vibrating parts 81 defining an H-shape. Each of the vibrating parts 81 consists of a driving vibration plate 82 and a detecting vibration plate 83 unitary disposed at an end of the driving vibration plate 82. A widthwise direction (Y direction) of the detecting vibration plate 83 is perpendicular to that (X direction) of the driving vibration plate 82. A driving piezo-electric element 84 is mounted on an outer surface in the widthwise direction (X direction) of each of the driving vibration plates 82. On the other hand, detecting piezo-electric elements 85 is mounted on both sides in the widthwise direction (Y direction) of each of the detecting plates 83. As shown in FIGS. 21 and 22, left and right driving piezo-electric elements 84 are equal in polarity with each other, and upper and lower driving piezo-electric elements 84 are opposite to each other. With respect to the polarity of the detecting piezo-electric elements 85, the same on diagonal lines viewing from the front of the vibrator 80, opposite in left and right of the vibrator 80 and opposite in front and rear sides of the detecting plate 83, with each other. The vibrator 80 is supported by a supporting bar 86 on a line passing through a center of the vibrator 80, and the supporting bar 86 is secured to a casing 87.

The operation of the vibration gyro of the seventh embodiment will be described.

Figure 23:
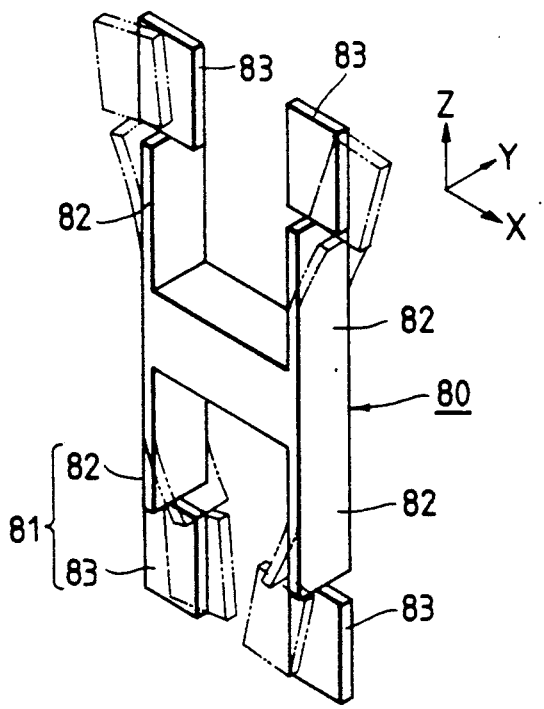
FIG. 23 is a perspective view showing a driving vibration mode of a vibrator shown in FIG. 21.
Figure 24:
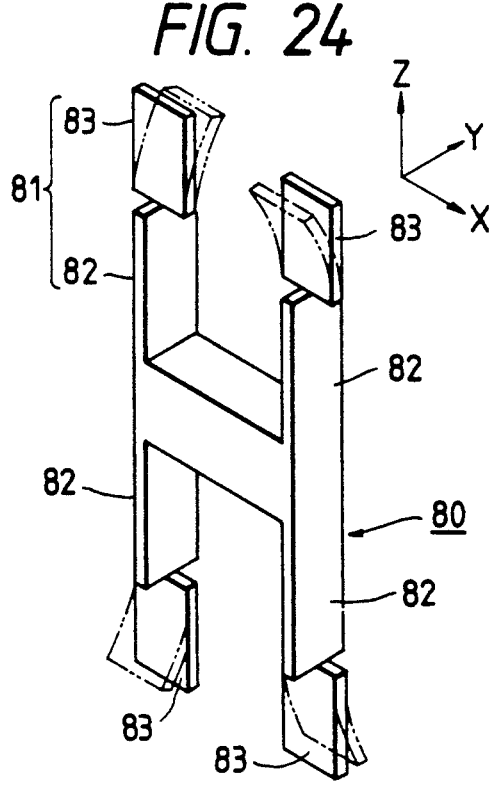
FIG. 24 is a perspective view showing a detecting vibration mode of the vibrator shown in FIG. 21.

When an alternating voltage is applied to the driving piezo-electric elements 84 mounted on the driving vibration plates 82, the vibration plates 82 vibrate in a vibration mode in which upper and lower vibrating parts 81 direct opposite to each other and left and right parts 81 direct bilaterally in the X direction as shown in FIG. 23. Therefore, the detecting vibration plates 83 unitary formed with the driving vibration plates 82 vibrate together with the driving vibration plates 82 as shown in FIG. 23. Under this condition, if an angular velocity directing around Z axis is applied to the vibrator 80, the detecting vibration plate 83 generates Corioli's force in the Y direction perpendicular to the X direction so that the detecting vibration plates 83 vibrate in the Y direction as shown in FIG. 24. Accordingly, the detecting piezo-electric element 85 generates a voltage in accordance with the vibration of the detecting part 83 thereby detecting the Corioli's force.

During the operation of detecting the Corioli's force as described above, since the driving vibration plate 84 vibrates in the widthwise direction (X direction) of the detecting vibration plate 83, the detecting vibration plate 83 hardly bends in the driving vibration mode shown in FIG. 23. On the other hand, since the detecting vibration plate 83 vibrates by the Corioli's force in the widthwise direction (Y direction) of the driving vibration plate 82, the detecting vibration plate 83 hardly bends in the driving detecting vibration mode shown in FIG. 24. Therefore, since the detecting vibration plate 83 would not vibrate by the driving vibration mode in the detecting vibration direction (Y direction), any leakage of the voltage due to the mechanical influence will sufficiently be suppressed.

Further, the vibrator 80 is supported by the supporting bar 86 at a gravitational center thereof and therefore the vibrator 80 would not be influenced by any external vibration such as the driving vibration by the driving piezo-electric elements 84 or the vibration due to the Corioli's force, thereby improving a detecting accuracy.

Moreover, according to the seventh embodiment of the invention, since the supporting bar 86 supports the vibrator 80 at a node of the driving vibration mode, the driving vibration mode would not be influenced by the supporting bar 86. Further, the detecting vibration mode would not be influenced by the supporting bar 86 either because of its position. Therefore, Corioli's force can be detected stably and accurately.

Figure 25:
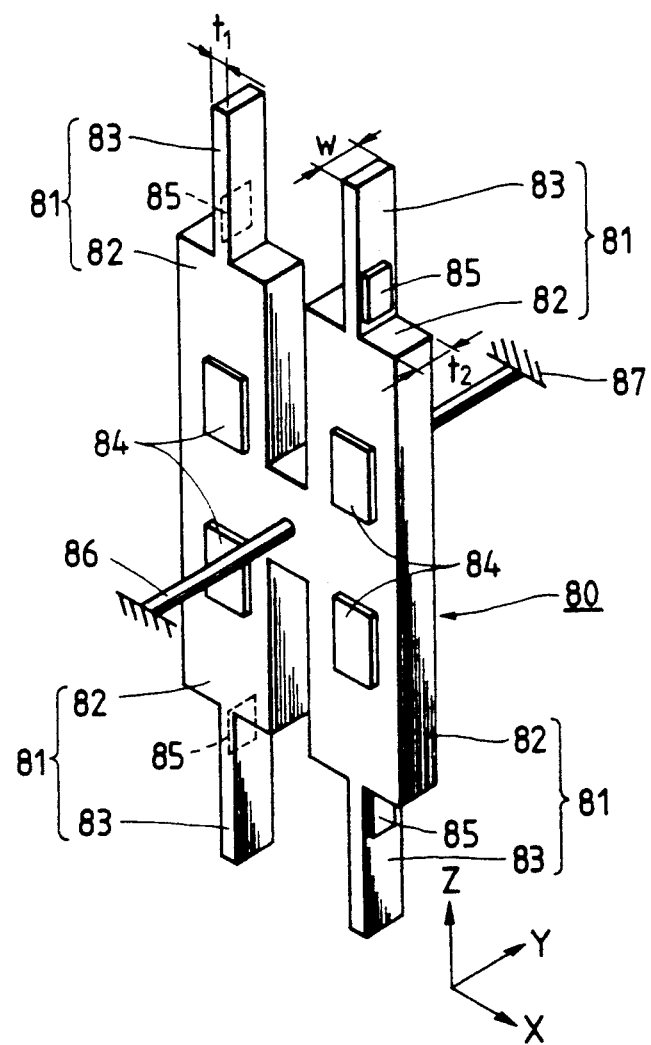
FIG. 25 is a perspective view showing a eighth embodiment of a vibration gyro according to the present invention.

FIG. 25 is a perspective view showing a vibration gyro of an eighth embodiment according to the present invention.

A vibration gyro of this embodiment is substantially the same in structure and function as that of the seventh embodiment shown in FIGS. 21 to 24. However, in the eighth embodiment, a thickness t1 of the detecting vibration plate 83 is smaller than that t2 of the detecting vibration plate 82, and a width W of the detecting vibration plate 83 is the same as the thickness t2 of the driving vibration plate 82.

In the eighth embodiment, the driving and detecting vibration modes are reverse in direction to that of the seventh embodiment shown in FIGS. 21 to 24. That is, the driving vibration mode of the driving vibration plate 82 by the driving piezo-electric element 84 of the eighth embodiment is the same as that of the detecting vibration plate shown in FIG. 24 and the detecting vibration mode of the detecting vibration plate 83 by Corioli's force is the same as that of the driving vibration plate shown in FIG. 23.

According to the eighth embodiment, the preferred shape of the vibrator is readily be obtained by an easy processing of cutting a single plate out. Therefore, the vibrator of the eighth embodiment can easily be processed compared to the vibrator of the seventh embodiment.

The supporting bar 86 is not limited to that described in the seventh and eighth embodiments, that is, the supporting bar may pass through the center of the side in the X direction and be secured to the casing 87.

As described above, according to the present invention, since the torsional piezo-electric element generating a voltage in proportion to an amount of the torsion of the element is mounted on a center part of the H-shaped vibrator, any leakage of the driving voltage would not influence to the detecting element thereby detecting the Corioli's force stably and accurately.

Further, in the present invention, the H-shaped vibrator is provided with a narrow part on a center of the connecting part of the vibrator, a supporting bar passing through the narrow part, and a torsional detecting piezo-electric element mounted on the narrow part, the supporting system would not influence to the driving and the detecting vibration modes. Therefore, a leakage of the driving voltage applied to the detecting piezo-electric element can be sufficiently suppressed. Further, the Corioli's force can stably be obtained with small in variations thereof due to the variation in temperature and time.

Further, according to the present invention, a vibrator may consist of a pair of substantially U-shaped members adhered opposite to each other through a piezo-electric plate generating a voltage in response to a torsional force applied between the opposite surfaces of the adhered surfaces of the piezo-electric plates. Therefore, the detecting voltage of the Corioli's force can be obtained at the largest. Further, the piezo-electric plate does not have to be thickened, the vibration gyro can be made small in size.

Furthermore, since the detecting piezo-electric plate may be provided with a plurality of projecting parts supporting the vibrator, the vibrator can be supported at a portion which does not move during the vibration of the vibrator thereby improving a stability of the detected voltage of the detecting piezo-electric plate. Further, the voltage can be taken from the projecting parts of the detecting piezo-electric plate which projecting parts support the vibrator, no electric wire is necessary and the gyro can be advantageously made simple in structure. Further, since the projecting parts are unitary formed with the detecting piezo-electric plate, the supporting system has a sufficient mechanical strength.

Moreover, according to the present invention, each of four vibrating parts defining an H-shaped vibrator consist of a driving vibration plate and a detecting vibration plate disposed at an end of the driving vibration plate, a width of the driving vibration plate is perpendicular to that of the detecting vibration plate and the supporting bar passes through a gravitational center of the H-shaped vibrator, a leakage of the driving voltage applied to the detecting piezo-electric element can be sufficiently suppressed. Further, according to the invention, the vibration gyro would not be influenced by an external vibration, and the vibrations by Corioli's force and by the driving vibration would not be influenced by the supporting system, thereby stably obtaining a vibration gyro high in sensitivity.

Moreover, since a width of the detecting piezo-electric plate is the same as that of the driving piezo-electric plate, a preferred shape of the vibrator can be made by a simple processing of cutting a single plate so that the vibrator can readily be processed.

What is claimed is:

1. A vibration gyro comprising:
   a substantially H-shaped vibrator formed of a first member, a second member having at least a portion which is substantially parallel to at least a portion of said first member, and a third member extending between said first and second members, and substantially perpendicular to said portions of both;
   means for driving said vibrator;
   means for detecting Corioli's force generated when an angular velocity is applied to said vibration gyro during the driving by said driving means, said detecting means being formed of a torsional piezo-electric material, of a type which responds to torsional modes; and
   means for supporting said vibrator.

2. The vibration gyro of claim 1, wherein said driving means includes four piezo-electric elements mounted on respective side surfaces in a widthwise direction of said first and second members, one element at an upper part and one element at a lower part of each of said first and second members wherein said elements at said upper and lower parts are opposite in polarity to each other and said elements in a same upper/lower location on said first and second members are equal in polarity to each other.

3. The vibration gyro of claim 1, wherein said torsional piezo-electric material is mounted on both surfaces of said third member, material on each surface having a same polarity.

4. The vibration gyro of claim 1, wherein said torsional piezo-electric material consists of two types of piezo-electric elements, opposite in polarization to one another, generating a voltage in accordance with a sliding torsion applied thereof.

5. The vibration gyro of claim 4, wherein said two types of piezo-electric materials meet one another at a longitudinal split.

6. The vibration gyro of claim 4, wherein said two types of piezo-electric materials meet one another at a transverse split.

7. The vibration gyro of claim 1, wherein said third member is a thin, plate-like center part, said detecting means being mounted thereon.

8. The vibration of claim 7, wherein said means for supporting is formed as unitary with said center part.

9. The vibration gyro of claim 8, wherein said means for supporting comprises two projections.

10. The vibration gyro of claim 1, wherein said driving means drives to cause vibration in a primary vibration mode.

11. The vibration gyro of claim 1, wherein said first and second members are substantially fork-shaped, unitary and oppositely connected to each other through said third member, and wherein said third member is narrow in width and said detecting means is mounted thereon.

12. The vibration gyro of claim 11, wherein said means for supporting supports said narrow portion of said vibrator, which is a node of a detection vibration mode.

13. The vibration gyro of claim 11, wherein each of said fork-shaped members has a thick bottom part.

14. The vibration gyro of claim 1, wherein said first and second members are substantially U-shaped.

15. The vibration gyro of claim 14, wherein said detecting means comprises at least two piezo-electric plates disposed on said third member between said U-shaped members, and a metal plate disposed between said piezo-electric plates.

16. The vibration gyro of claim 14, wherein said piezo-electric plate is formed by two piezo-electric materials generating a voltage in accordance with a sliding torsion applied thereto.

17. The vibration gyro of claim 16, wherein said two materials are longitudinally split.

18. The vibration gyro of claim 16, wherein said two materials are transversely split.

19. The vibration gyro of claim 14, wherein said supporting means passes through a longitudinal center of said vibrator.

20. The vibration gyro of claim 1, wherein said first, second and third members form two substantially U-shaped members, each of said U-shaped members including a disc-shaped base part and two leg parts unitarily formed with said base part.

21. The vibration gyro of claim 20, wherein said detecting means comprises a disc-shaped piezo-electric plate disposed between said disc-shaped base parts.

22. The vibration gyro of claim 21, wherein said U-shaped membrane is formed of a conductive material.

23. The vibration gyro of claim 22, wherein at least one side of said detecting piezo-electric plate is insulated from said U-shaped member.

24. The vibration gyro of claim 21, wherein said U-shaped member is formed of a non-conductive material, said vibration gyro further comprising means for grounding.

25. The vibration gyro of claim 21, wherein said U-shaped members are disposed perpendicularly to each other.

26. The vibration gyro of claim 15, wherein said supporting means comprises at least one projection unitarily formed with said metal plate.

27. The vibration gyro of claim 26, wherein said projection extends on a center line of said vibrator.

28. The vibration gyro of claim 17, wherein said projection extends in a thickness of said vibrator.

29. The vibration gyro of claim 27, wherein said projection extends to a widthwise direction of said vibrator.

30. The vibration gyro of claim 27, wherein said projection extends to a thickness and a widthwise direction of said vibrator.

31. A vibration gyro comprising:
a substantially H-shaped driving vibration part formed of a first member, a second member having at least a portion which is substantially parallel to at least a portion of said first member, and a third member extending between said first and second members, and substantially perpendicular to said portions of both;
a detecting vibration part;
means for detecting Corioli's force generated when an angular velocity is applied to said vibration gyro during the driving by said driving means, said detecting means being formed of a torsional piezo-electric material of a type which responds to torsional modes; and
means for supporting said driving vibration part.

32. The vibration gyro of claim 31, wherein a thickness direction of said driving vibration part is perpendicular to that of said detecting vibration part.

33. The vibration gyro of claim 32, wherein said supporting member passes through a center portion of said vibrator which is a node of the driving vibration, and said supporting member extends in a thickness direction of said driving vibration part.

34. The vibration gyro of claim 31, wherein said supporting member passes through a center portion of said vibrator which is a node of the driving vibration, and said supporting member extends in a widthwise direction of said driving vibration part.

35. The vibration gyro of claim 31, wherein said driving means comprises four piezo-electric elements mounted on said driving vibration part, an upper and lower of which are opposite in polarity to each other and a left and right of which having the same polarity as each other, and said detecting means comprises four piezo electric elements mounted on said detecting vibration part, upper and left, left and right, and on diagonal lines of which are opposite to each other.

36. The vibration gyro of claim 31, wherein a thickness of said detecting vibration part is smaller than that of said driving vibration part, and a width of said detecting vibration part is the same as said thickness of said driving vibration part.

37. The vibration gyro of claim 36, wherein said driving means comprises four piezo-electric elements mounted on a front surface of said vibrator, an upper and lower of which is opposite to each other, and said detecting means comprises four piezo-electric elements mounted on a front surface of said detecting vibration part.

* * * * *